US011607984B2

(12) United States Patent
Kajita et al.

(10) Patent No.: US 11,607,984 B2
(45) Date of Patent: Mar. 21, 2023

(54) VEHICLE CONVEYOR

(71) Applicant: TOYOTA JIDOSHA KABUSHIKI KAISHA, Toyota (JP)

(72) Inventors: Naoya Kajita, Toyota (JP); Kenji Nakano, Toyota (JP); Takafumi Sannomiya, Okazaki (JP); Yasutada Shimizu, Okazaki (JP)

(73) Assignee: TOYOTA JIDOSHA KABUSHIKI KAISHA, Toyota (JP)

( * ) Notice: Subject to any disclaimer, the term of this patent is extended or adjusted under 35 U.S.C. 154(b) by 0 days.

(21) Appl. No.: 17/590,152

(22) Filed: Feb. 1, 2022

(65) Prior Publication Data

US 2022/0306225 A1 Sep. 29, 2022

(30) Foreign Application Priority Data

Mar. 23, 2021 (JP) .............................. JP2021-049035

(51) Int. Cl.
| | |
|---|---|
| *B62D 65/18* | (2006.01) |
| *B60P 3/075* | (2006.01) |
| *B60P 3/07* | (2006.01) |
| *B60S 13/00* | (2006.01) |

(52) U.S. Cl.
CPC ............... *B60P 3/075* (2013.01); *B60P 3/07* (2013.01); *B60S 13/00* (2013.01); *B62D 65/18* (2013.01)

(58) Field of Classification Search
CPC .. B60P 3/075; B60P 3/07; B60S 13/00; B62D 65/18
See application file for complete search history.

(56) References Cited

U.S. PATENT DOCUMENTS

| | | | |
|---|---|---|---|
| 5,286,156 A * | 2/1994 | Ikenouchi | ............... E04H 6/183 414/256 |
| 10,590,669 B2 * | 3/2020 | Boussard | ............... B62D 65/18 |
| 11,312,415 B2 * | 4/2022 | Tzivanopoulos | ....... B60S 13/00 |
| 2008/0031711 A1 * | 2/2008 | Yook | ....................... E04H 6/305 414/253 |
| 2018/0142488 A1 | 5/2018 | Boussard et al. | |
| 2019/0322205 A1 * | 10/2019 | Dombrowski | .......... B60S 13/00 |

FOREIGN PATENT DOCUMENTS

| | | |
|---|---|---|
| CN | 2399477 Y | 10/2000 |
| JP | 2019-078099 A | 5/2019 |
| WO | 2016/189233 A1 | 12/2016 |

\* cited by examiner

*Primary Examiner* — Ryan J. Walters
(74) *Attorney, Agent, or Firm* — Dinsmore & Shohl LLP (57) ABSTRACT

A vehicle conveyor includes a slide member that is provided on each of opposite side faces of a carriage portion, and slides along a longitudinal direction of the carriage portion, independently of the carriage portion. A first arm set and first arm actuators are joined to the slide members, and are configured to slide along the longitudinal direction of the carriage portion, integrally with the slide members, independently of the carriage portion.

9 Claims, 10 Drawing Sheets

VEHICLE CONVEYOR

CROSS-REFERENCE TO RELATED APPLICATION

This application claims priority to Japanese Patent Application No. 2021-049035 filed on Mar. 23, 2021, incorporated herein by reference in its entirety.

BACKGROUND

1. Technical Field

The disclosure relates to a vehicle conveyor that conveys a four-wheel vehicle.

2. Description of Related Art

Japanese Unexamined Patent Application Publication No. 2019-078099 (JP 2019-078099 A) discloses a lift conveyance carriage that is simple in construction, and is able to support, lift, and convey a vehicle, using small-capacity actuators. The lift conveyance carriage conveys the vehicle, by supporting the tires of the vehicle with its arm portions, lifting the vehicle, and traveling.

WO 2016/189233 discloses a conveyor for moving a four-wheel vehicle. The conveyor includes a chassis having stowable, movable arms. The chassis has a telescopic structure, and consists of two segments each including a pair of arms. Also, the segments are movable between a position where the movable arms are not in contact with the wheels and a position where each movable arm is in contact with the tread of one of the wheels.

SUMMARY

As disclosed in JP 2019-078099 A, a vehicle conveyor (lift conveyance carriage) is proposed which conveys a four-wheel vehicle, by inserting a carriage portion (carriage frame) under the vehicle, supporting the vehicle with an arm set (arm portions) provided on the carriage portion, for making contact with each of the wheels, and moving the vehicle in a condition where the carriage portion is raised to lift the vehicle. Where the vehicle conveyor is used to convey a plurality of vehicles of different types, it is necessary to adjust the positions of arms that make contact with the vehicle wheels, in accordance with the positions of the wheels.

In the conveyor described in WO 2016/189233, the carriage portion (chassis) has a telescopic structure, and consists of two segments. This arrangement makes it possible to adjust the positions of the arms (movable arms) that support the wheels, by moving the segments. However, when a mechanism that partially expands and contracts the carriage portion is employed, the size of the conveyor is increased, upon formation of the carriage portion that ensures rigidity sufficient to convey the vehicle.

This disclosure provides a vehicle conveyor that is able to adjust the positions of arms that make contact with the vehicle wheels, without partially expanding or contracting a carriage portion.

A vehicle conveyor according to one aspect of the disclosure is an apparatus for conveying a vehicle with four wheels having a pair of front wheels and a pair of rear wheels. The vehicle conveyor includes a carriage portion inserted under the vehicle in a longitudinal direction of the vehicle, and an arm set that is mounted to the carriage portion. The arm set includes a first arm set operable to support a pair of first wheels as one of the pair of front wheels and the pair of rear wheels, and a second arm set operable to support a pair of second wheels as the other of the pair of front wheels and the pair of rear wheels. The vehicle conveyor further includes a first arm actuator connected to the first arm set, and operable to switch the first arm set between a support state in which the first arm set is in contact with the first wheels, and a release state in which the first arm set is not in contact with the first wheels, a second arm actuator connected to the second arm set, and operable to switch the second arm set between a support state in which the second arm set is in contact with the second wheels, and a release state in which the second arm set is not in contact with the second wheels, and a slide member that is provided on each of opposite side faces of the carriage portion, and is configured to slide in a longitudinal direction of the carriage portion, independently of the carriage portion. The first arm set and the first arm actuator are joined to the slide member, and are configured to slide in the longitudinal direction integrally with the slide member, independently of the carriage portion. The vehicle is conveyed when moved in a condition where the vehicle is supported with the first arm set and the second arm set in contact with the first wheels and the second wheels, respectively, and the carriage portion is raised to lift the vehicle.

In the vehicle conveyor as described above, the slide member may be configured to slide while being engaged with a rail portion provided on each of the opposite side faces of the carriage portion.

The vehicle conveyor as described above may further include a main body portion that is provided at one end of the carriage portion in the longitudinal direction, on one side where the first arm set is provided, and provides a traveling function of the vehicle conveyor and a function of raising and lowering the carriage portion, and a slide actuator provided between the main body portion and the slide member, and configured to slide the slide member. The slide actuator may include a rod-like movable portion joined to the slide member and configured to move in the longitudinal direction to slide the slide member. The first arm set may include a fixed arm adapted to be in contact with one of the first wheels, on one side where the main body portion is provided. An end portion of the fixed arm may be joined to the slide member with a screw, in a condition where the fixed arm extends in a direction perpendicular to the longitudinal direction of the carriage portion. A joined portion of the slide member and the movable portion of the slide actuator may be located on an inner side of a joined portion of the slide member and the fixed arm, as viewed in the direction perpendicular to the longitudinal direction of the carriage portion.

In the vehicle conveyor as described above, the slide member may have a plurality of ribs, and the joined portion of the slide member and the fixed arm may be sandwiched between the ribs.

The vehicle conveyor as described above may further include a top panel joined to the first arm set and the slide member. The top panel may be configured to slide in the longitudinal direction, integrally with the slide member, independently of the carriage portion.

In the vehicle conveyor as described above, the slide member may have a plurality of ribs, and the top panel and the slide member may be joined at the ribs.

The vehicle conveyor as described above may further include a harness protection member configured to protect a wire harness that supplies power to each of the arm actuators. The harness protection member may be joined to the slide member, and may be configured to slide along the longitudinal direction, integrally with the slide member, independently of the carriage portion.

In the vehicle conveyor according to the disclosure, the first arm set and the first arm actuator are configured to slide in the longitudinal direction of the carriage portion, independently of the carriage portion. This arrangement makes it possible to adjust the positions of the arms in accordance with the positions of the wheels, without partially expanding or contracting the carriage portion. Consequently, the vehicle conveyor can employ a mechanism that is able to adjust the positions of the arms, without significantly increasing the size of the conveyor.

BRIEF DESCRIPTION OF THE DRAWINGS

Features, advantages, and technical and industrial significance of exemplary embodiments of the disclosure will be described below with reference to the accompanying drawings, in which like signs denote like elements, and wherein.

DETAILED DESCRIPTION OF EMBODIMENTS

One embodiment of the disclosure will be described with reference to the drawings. In the embodiment described below, when the number, such as the number of pieces, numerical quantity, quantity, range, etc., of each element is mentioned, the concept according to this disclosure is not limited to the number thus mentioned, unless it is particularly clearly indicated as such, or clearly specified in principle. Also, the configuration, etc. that will be described in this embodiment is not necessary to the concept according to the disclosure, unless it is particularly clearly indicated as such, or clearly specified in principle. In the drawings, the same reference signs are assigned to the same or corresponding portions, and repeated explanation of the portions will be simplified or omitted as appropriate.

1. Vehicle Conveyor

Figure 1:
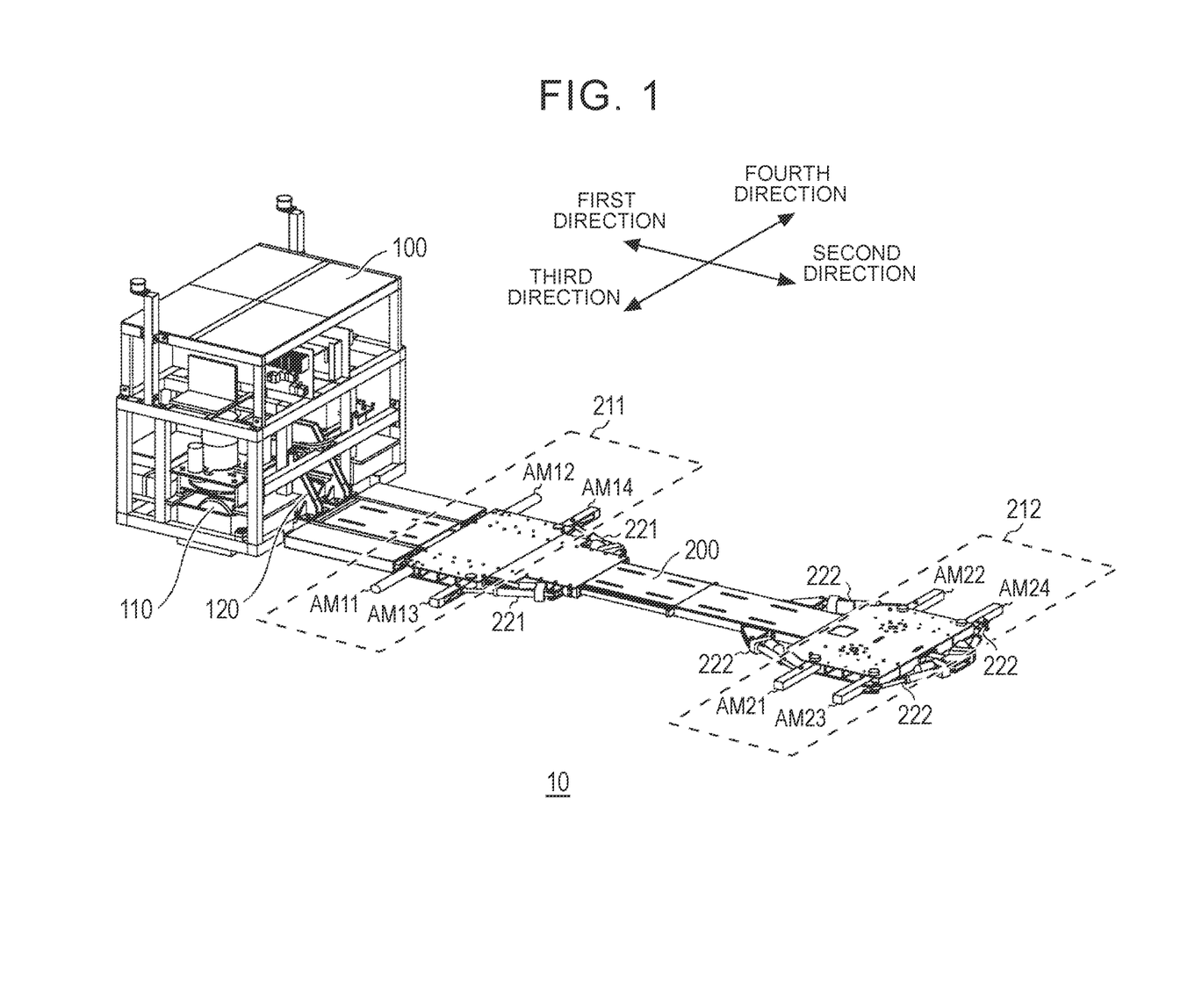
FIG. 1 is a perspective view of a vehicle conveyor according to one embodiment.

FIG. 1 is a perspective view of a vehicle conveyor 10 according to this embodiment. The vehicle conveyor 10 includes a main body portion 100, carriage portion 200, first arm set 211, second arm set 212, first arm actuators 221, and second arm actuators 222. The main body portion 100 is provided at one longitudinal end of the carriage portion 200 on one side where the first arm set 211 is provided.

The vehicle conveyor 10 supports a four-wheel vehicle, such that the carriage portion 200 is inserted under the vehicle in the longitudinal direction of the vehicle, and the first arm set 211 and second arm set 212 mounted to the carriage portion 200 make contact with the front wheels and rear wheels, respectively, of the vehicle. Then, the vehicle conveyor 10 moves in a condition where the carriage portion 200 is raised to lift the vehicle, so as to convey the vehicle.

Typically, the carriage portion 200 of the vehicle conveyor 10 is inserted from the front of the vehicle. Namely, the vehicle conveyor 10 supports the vehicle such that the first arm set 211 makes contact with the front wheels of the vehicle, and the second arm set 212 makes contact with the rear wheels of the vehicle. However, the vehicle conveyor 10 may support the vehicle, by inserting the carriage portion 200 from the rear of the vehicle.

Regarding the directions of the vehicle conveyor 10, the direction in which the main body portion 100 is provided will be referred to as "first direction", and the direction opposite to the first direction will be referred to as "second direction", while the leftward direction relative to the first direction will be referred to as "third direction", and the rightward direction relative to the first direction will be referred to as "fourth direction", as shown in FIG. 1. In the following description, the wheels of the vehicle located in the first direction when the carriage portion 200 is inserted under the vehicle will also be called "first wheels", and the wheels of the vehicle located in the second direction will also be called "second wheels".

The main body portion 100 includes drive wheels 110 that provide a traveling function of the vehicle conveyor 10, and an elevator 120 that provides a function of raising and lowering the carriage portion 200. Each of the drive wheels 110 and the elevator 120 is typically driven by an actuator. Here, the mechanism of the elevator 120 is not limited to any particular one. For example, the carriage portion 200 may be raised and lowered by a hydraulic cylinder, or an air spring.

The main body portion 100 includes a power source and a controller, which are not clearly indicated in FIG. 1. The power source supplies power to various actuators included in the vehicle conveyor 10. Typically, a battery that serves as the power source is electrically connected to each of the actuators via a wire harness, and supplies electric power to the actuator. In the following description, it is assumed that the power source is a battery, which supplies electric power to each of the actuators via a wire harness.

The controller outputs control signals for driving and controlling various actuators included in the vehicle conveyor 10. The actuators operate according to the control signals. The controller is configured to be able to transmit information to each of the actuators. Typically, the controller is electrically connected to each of the actuators via a wire harness. However, the controller may transmit information to each actuator by other methods. For example, the controller may be configured to be able to transmit information via wireless communications or optical communications.

The controller may be provided outside the vehicle conveyor 10. In this case, the controller is configured to be able to transmit information to each of the actuators via communications.

The first arm set 211, second arm set 212, first arm actuators 221, and second arm actuators 222 are mounted to the carriage portion 200.

The first arm set 211 includes an arm AM 11, arm AM 12, arm AM 13, and arm AM 14. The arm AM 11 and the arm AM 13 form a pair, and make contact with one of the first wheels (e.g., left, front wheel) such that the wheel is sandwiched between the arms. The arm AM 12 and the arm AM 14 form a pair, and make contact with the other first wheel (e.g., right, front wheel) such that the wheel is sandwiched between the arms.

The second arm set 212 includes an arm AM 21, arm AM 22, arm AM 23, and arm AM 24. The arm AM 21 and the arm AM 23 form a pair, and make contact with one of the second wheels (e.g., left, rear wheel) such that the wheel is sandwiched between the arms. The arm AM 22 and the arm AM 24 form a pair, and make contact with the other second wheel (e.g., right, rear wheel) such that the wheel is sandwiched between the arms.

Thus, the first arm set 211 and the second arm set 212 make contact with the respective wheels, so as to support the vehicle.

The first arm actuators 221 are connected to the first arm set 211, and operate to switch the first arm set 211 between a support state in which the first arm set 211 is in contact with the first wheels, and a release state in which the first arm set 211 is not in contact with the first wheels. The second arm actuators 222 are connected to the second arm set 212, and operate to switch the second arm set 212 between a support state in which the second arm set 212 is in contact with the second wheels, and a release state in which the second arm set 212 is not in contact with the second wheels. In the following description, the first arm actuator 221 and the second arm actuator 222 will be generally called "arm actuator", except when they are distinguished from each other.

Figure 2A:
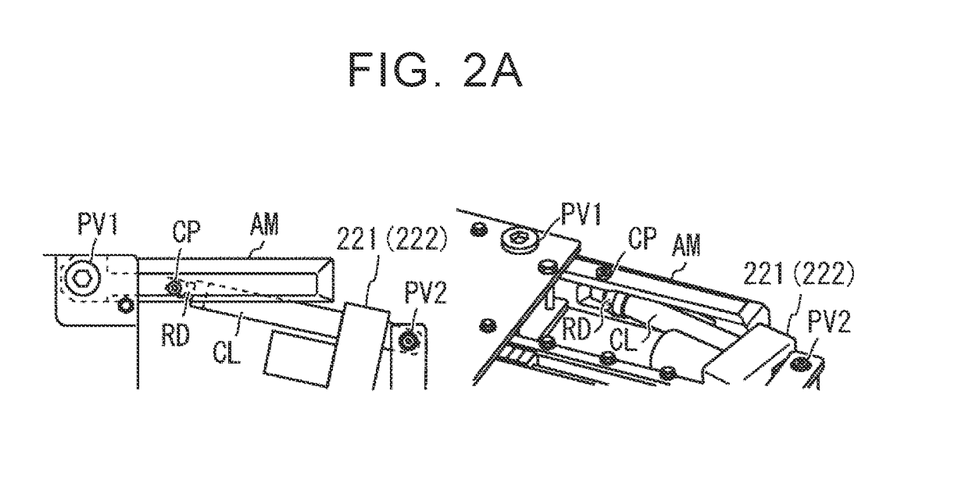
FIG. 2A is a view useful for describing operation of an arm actuator.
Figure 2B:
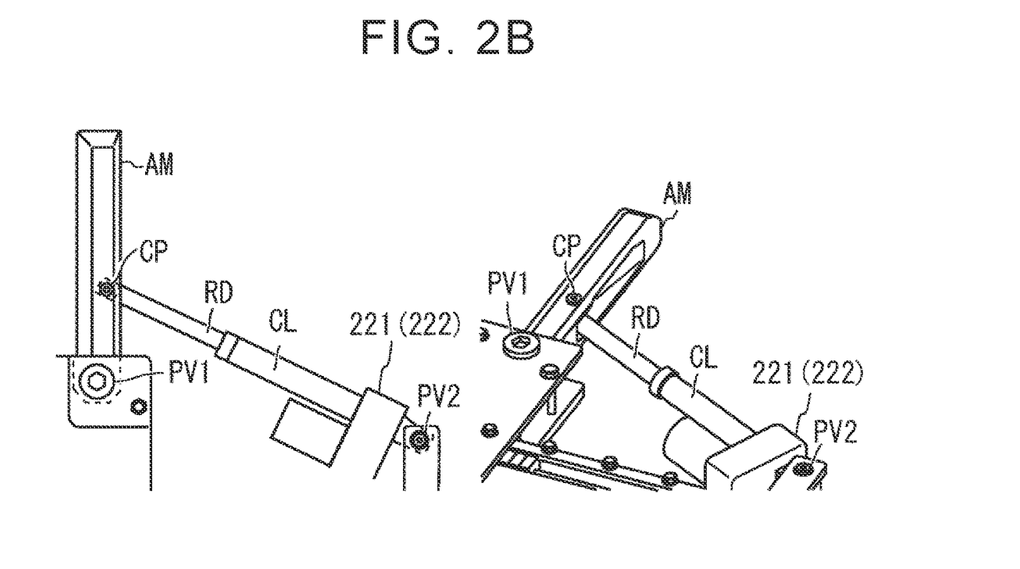
FIG. 2B is a view useful for describing operation of the arm actuator.

FIG. 2A and FIG. 2B are views useful for describing operation of the arm actuator (the first arm actuator 221 or second arm actuator 222). FIG. 2A shows one of the arms AM that is in the release state, and the corresponding arm actuator, and FIG. 2B shows the arm AM that is in the support state, and the corresponding arm actuator. The arm actuator has a rod RD connected to the arm AM at a position CP, and a cylinder CL that houses the rod.

The arm actuator moves the rod RD in the axial direction of the cylinder CL. When the rod RD is pushed out, the arm AM rotates about a position PV1, and the cylinder CL rotates about a position PV2. When the rod RD is retracted, the arm AM and the cylinder CL rotate in directions opposite to those of the above rotations. In this manner, the arm AM moves from the release state to the support state, or from the support state to the release state.

The first arm actuators 221 are not connected to the arms AM that constitute the first arm set 211, and make contact with the first wheels on the side where the main body portion 100 is provided, namely, the arm AM 11 and the arm AM 12 (which will also be called "fixed arms") in FIG. 1. Each of these arms AM is fixed in a condition where it extends in a direction (the third direction or fourth direction in FIG. 1) perpendicular to the longitudinal direction of the carriage portion 200. The manner of fixing the arms AM will be described later.

Next, referring to FIGS. 3A, 3B, 4A, and 4B, operation in connection with conveyance of a vehicle 1 by the vehicle conveyor 10 according to this embodiment will be described. Here, the carriage portion 200 of the vehicle conveyor 10 is inserted from the front of the vehicle 1.

Figure 3A:
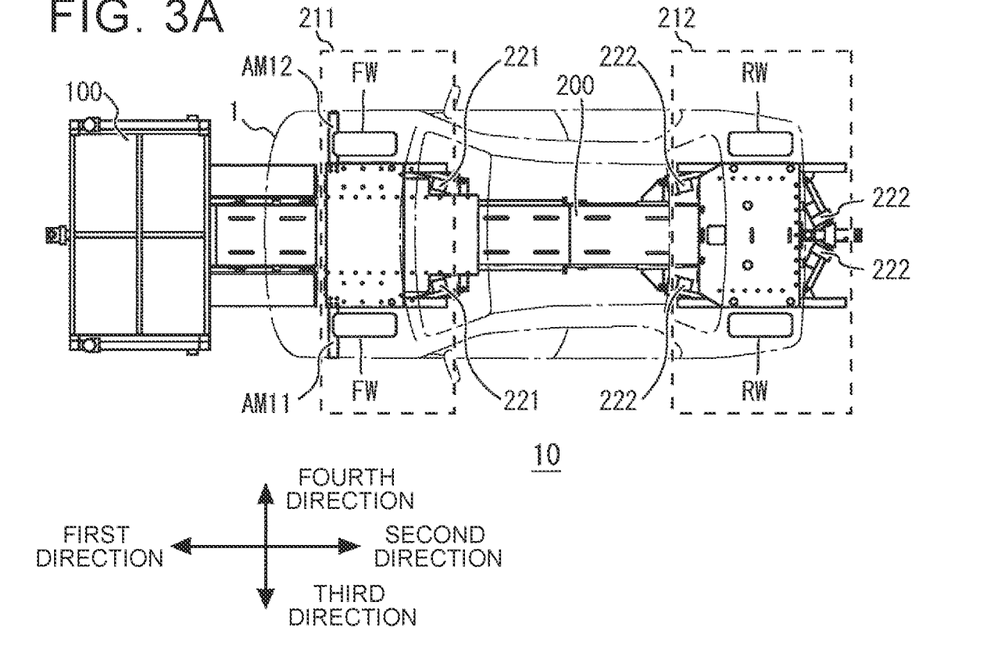
FIG. 3A is a top view showing an example of operation in which the vehicle conveyor according to the embodiment supports a vehicle.
Figure 3B:
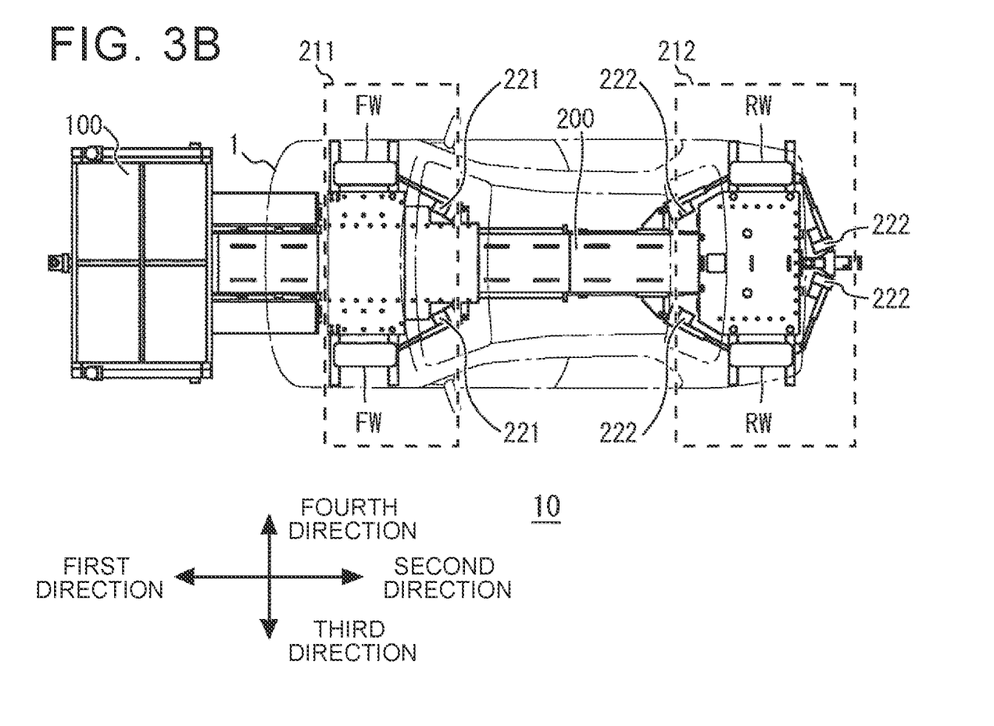
FIG. 3B is a top view showing an example of operation in which the vehicle conveyor according to the embodiment supports the vehicle.

FIG. 3A and FIG. 3B are top views of the vehicle conveyor 10, showing an example of operation to support the vehicle 1. As shown in FIG. 3A, the vehicle conveyor 10 places the first arm set 211 and the second arm set 212 in the release state, and inserts the carriage portion 200 from the front of the vehicle 1 into the under side of the vehicle 1. At this time, the fixed arms (the arm AM 11 and arm AM 12) make contact with the first wheels (the front wheels FW of the vehicle 1). Then, as shown in FIG. 3B, the first arm set 211 and the second arm set 212 are placed in the support state, so that the first arm set 211 and the second arm set 212 make contact with the first wheels and the second wheels (the front wheels FW and rear wheels RW of the vehicle 1), respectively, so as to support the vehicle 1.

Figure 4A:
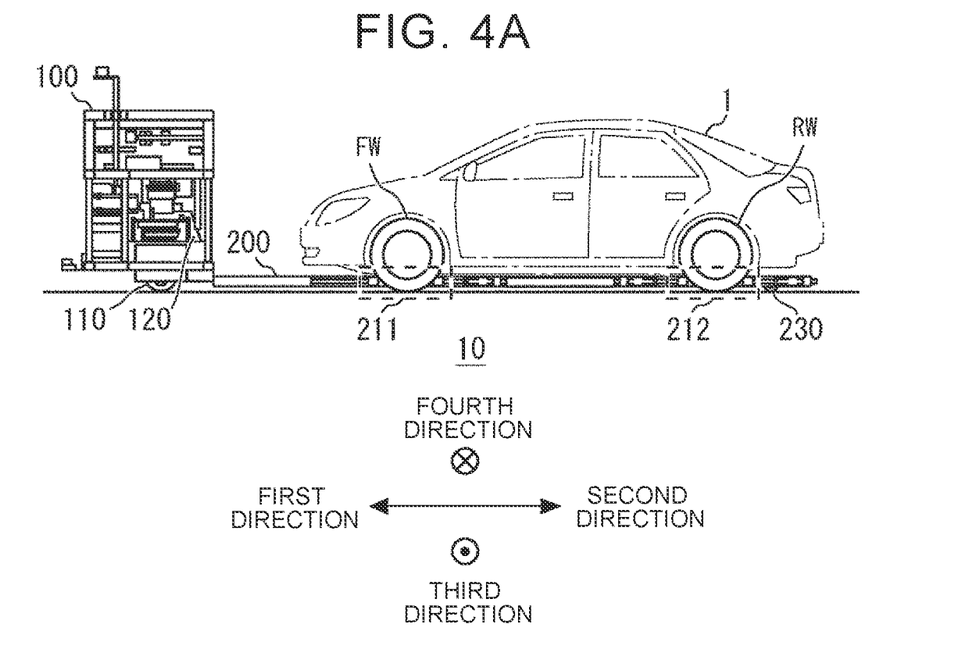
FIG. 4A is a side view showing an example of operation in which the vehicle conveyor according to the embodiment lifts the vehicle.
Figure 4B:
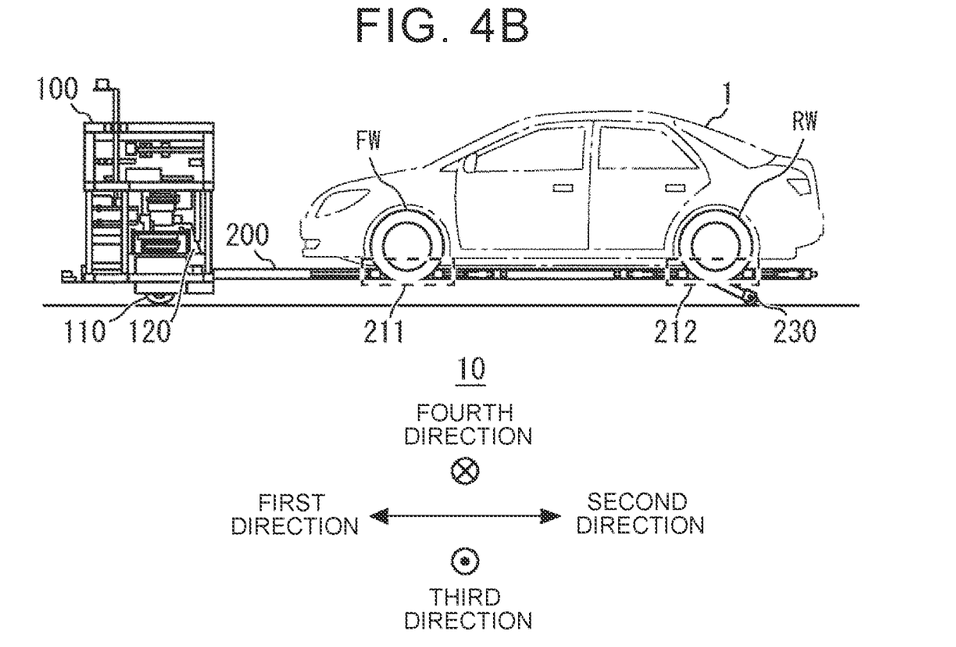
FIG. 4B is a side view showing an example of operation in which the vehicle conveyor according to the embodiment lifts the vehicle.

FIG. 4A and FIG. 4B are side views of the vehicle conveyor 10, showing an example of operation to lift the vehicle 1. As shown in FIG. 4A and FIG. 4B, the vehicle conveyor 10 lifts the vehicle 1 by raising the carriage portion 200 by the elevator 120, in a condition where the vehicle 1 is supported by the first arm set 211 and the second arm set 212.

As shown in FIG. 4B, a wheel 230 of the carriage portion 200 is configured to be able to roll while contacting the ground, even in a condition where the carriage portion 200 is elevated. For example, the vehicle conveyor 10 includes an actuator that operates to keep the position of the wheel 230 against elevation of the carriage portion 200. In this connection, two or more wheels 230 may be provided at different positions from the position shown in FIGS. 4A, 4B.

The vehicle conveyor 10 conveys the vehicle 1, by moving in a condition where the vehicle 1 is lifted up.

2. Slide Mechanism

As described above, the first arm set 211 and the second arm set 212 need to make contact with the first wheels and the second wheels, respectively, and support the vehicle 1, so that the vehicle conveyor 10 lifts the vehicle 1. Meanwhile, the vehicle conveyor 10 is supposed to convey a plurality of vehicles 1 of different types. In this case, the positions of the first wheels and the second wheels may be different depending on the vehicle 1 to be conveyed. Thus, the vehicle conveyor 10 needs to adjust the positions of the first arm set 211 and the second arm set 212, in accordance with the positions of the first wheels and the second wheels of the vehicle 1 to be conveyed.

The vehicle conveyor 10 according to this embodiment includes a slide mechanism with which the first arm set 211 and the first arm actuators 221 slide along the longitudinal direction of the carriage portion 200, independently of the carriage portion 200.

Figure 5A:
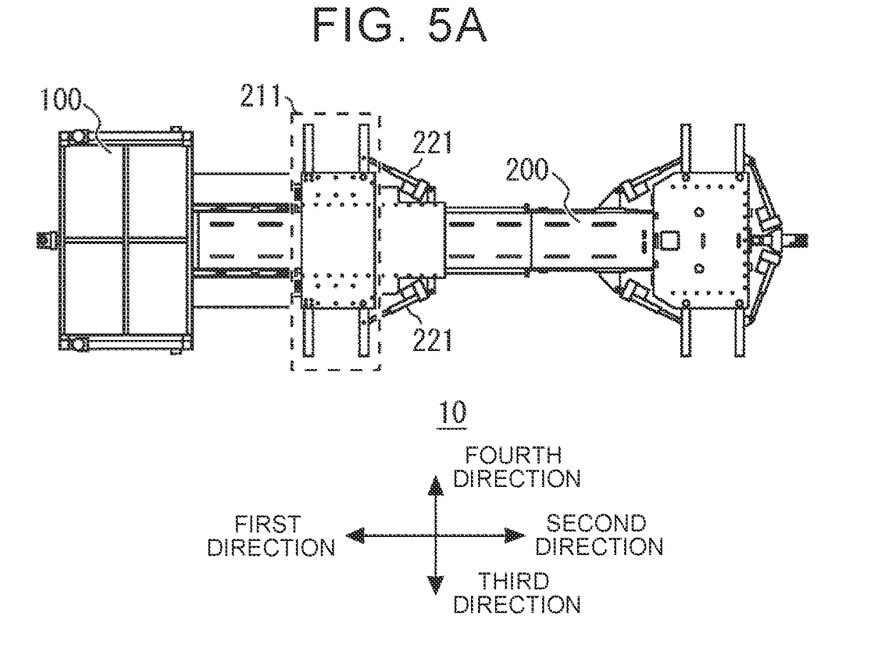
FIG. 5A is a top view showing an example of sliding of a first arm set and first arm actuators.
Figure 5B:
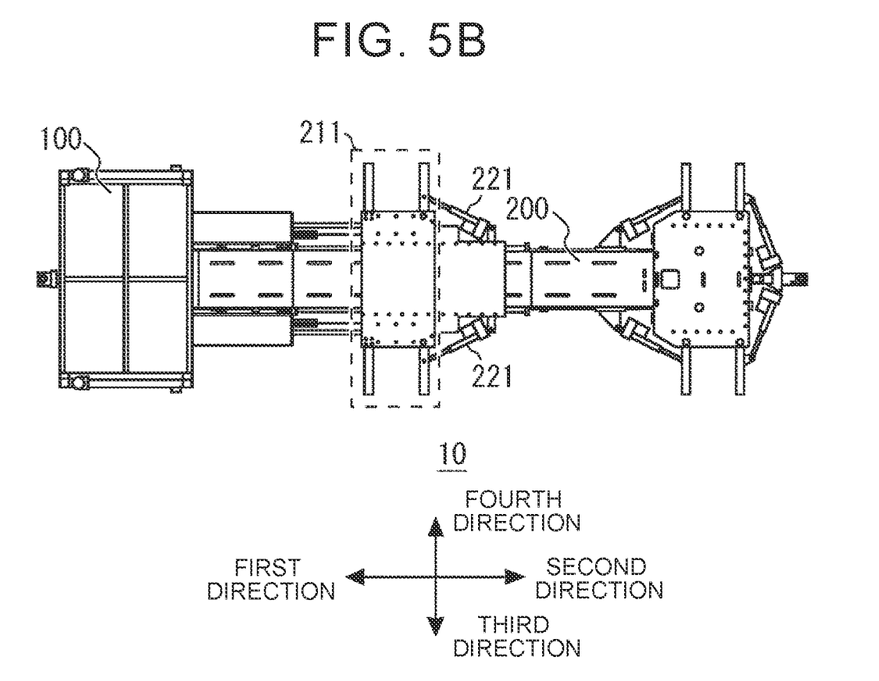
FIG. 5B is a top view showing an example of sliding of the first arm set and the first arm actuators.

FIG. 5A and FIG. 5B show an example of sliding of the first arm set 211 and the first arm actuators 221. FIG. 5A and FIG. 5B show two examples of sliding states of the first arm set 211 and the first arm actuators 221. In FIG. 5B, the first arm set 211 and the first arm actuators 221 slide in the second direction, along the longitudinal direction of the carriage portion 200, as compared with FIG. 5A. Here, the carriage portion 200 does not expand or contract, but the first arm set 211 and the first arm actuators 221 slide independently of the carriage portion 200.

Thus, the vehicle conveyor 10 according to this embodiment is configured such that the first arm set 211 and the first arm actuators 221 can slide along the longitudinal direction of the carriage portion 200, independently of the carriage portion 200.

In the following, the slide mechanism of the vehicle conveyor 10 according to this embodiment will be described in detail.

2-1. Structure of Slide Mechanism

Figure 6A:
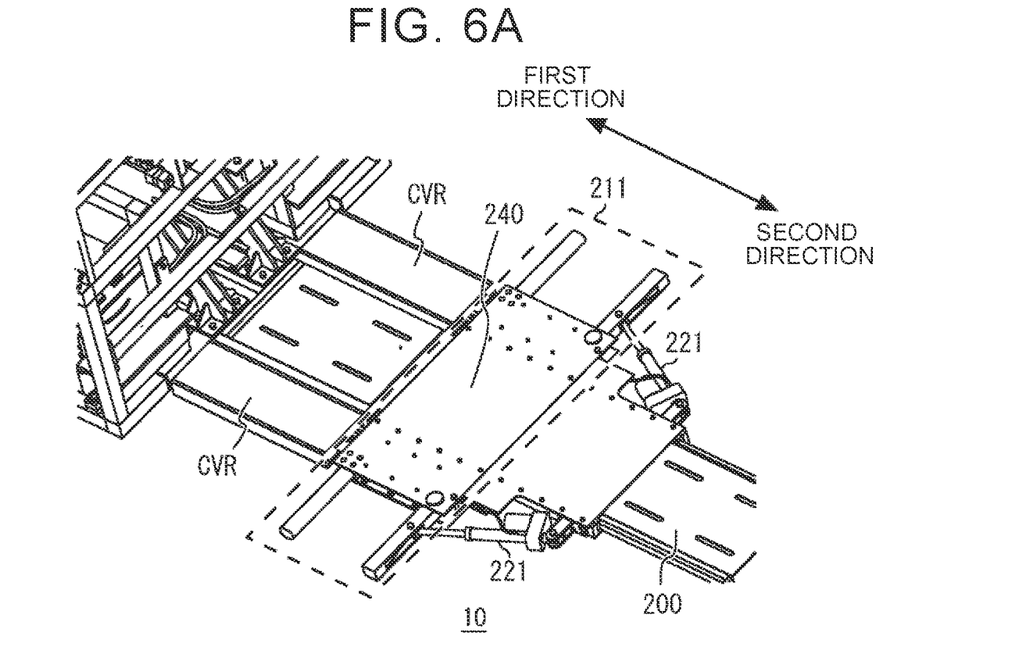
FIG. 6A is a view useful for describing the structure of a slide mechanism of the vehicle conveyor according to the embodiment.
Figure 6B:
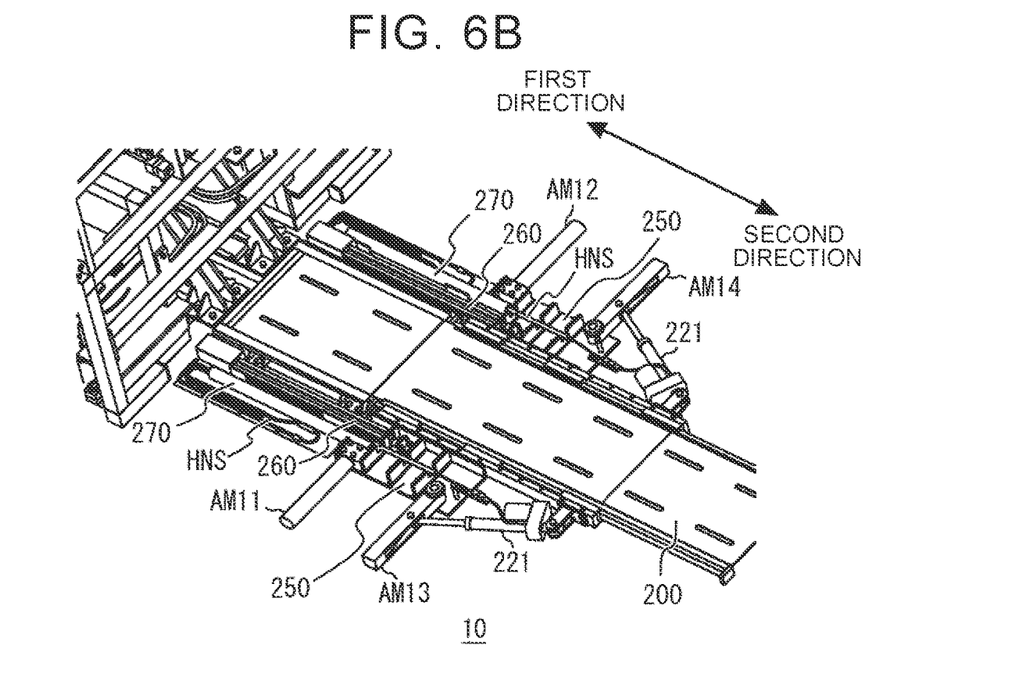
FIG. 6B is a view useful for describing the structure of the slide mechanism of the vehicle conveyor according to the embodiment.

FIG. 6A and FIG. 6B are views useful for describing the structure of the slide mechanism of the vehicle conveyor 10. FIG. 6A and FIG. 6B show a portion of the vehicle conveyor 10 including the first arm set 211, the first arm actuators 221, and the vicinity thereof. FIG. 6A shows the exterior appearance of the portion, and FIG. 6B shows the internal structure of the same portion from which a top panel 240 and covers CVR are removed. Here, the cover CVR is a member that protects an inside device, for improved maintainability of the vehicle conveyor 10. The top panel 240 will be described later.

As shown in FIG. 6B, the vehicle conveyor 10 includes slide members 250 and slide actuators 260.

The slide member 250 is provided on each of the opposite side faces of the carriage portion 200. The slide member 250 is configured to be able to slide along the longitudinal direction of the carriage portion 200, independently of the carriage portion 200. The configuration of the slide member 250 will be described later.

The slide actuator 260 is an actuator for sliding the slide member 250. The slide actuator 260 operates to change the sliding state of the slide member 250. The operation of the slide actuator 260 will be described later. The operation of the slide actuator 260 is typically controlled by the controller.

The first arm set 211 and the first arm actuators 221 are joined to the slide members 250. Accordingly, when the slide members 250 slide, the first arm set 211 and the first arm actuators 221 slide integrally with the slide members 250. As a result, the first arm set 211 and the first arm actuators 221 slide along the longitudinal direction of the carriage portion 200, independently of the carriage portion 200.

When the first arm actuators 221 slide in the second direction along the longitudinal direction of the carriage portion 200 as the slide members 250 slide, a part of each of the wire harnesses HNS for supplying electric power to the first arm actuators 221 is exposed. Consequently, the maintainability of the vehicle conveyor 10 may be reduced.

Thus, the vehicle conveyor 10 according to this embodiment includes harness protection members 270 that protect the wire harnesses HNS. Also, the harness protection members 270 are joined to the slide members 250. Accordingly, as the slide members 250 slide, the harness protection members 270 slide integrally with the slide members 250. As a result, the harness protection members 270 slide along the longitudinal direction of the carriage portion 200, independently of the carriage portion 200. Thus, the wire harnesses HNS are prevented from being exposed upon sliding of the first arm actuators 221, and the maintainability of the vehicle conveyor 10 can be improved.

As shown in FIG. 6A, the vehicle conveyor 10 includes the top panel 240. The top panel 240 is joined to the first arm set 211 and the slide members 250. Thus, the rigidity of the first arm set 211 and the slide members 250 against the load received from the vehicle 1 can be increased. Also, the top panel 240 in the form of a single body is joined to the first arm set 211 and the slide members 250, without being split at the opposite side faces of the carriage portion 200. Thus, it is possible to increase the area that receives the load of the vehicle 1, and further increase the rigidity against the load received from the vehicle 1.

Here, the top panel 240 is joined to the first arm set 211 and the slide members 250, but is not joined to the carriage portion 200. Accordingly, as the slide members 250 slide, the top panel 240 slide integrally with the slide members 250. As a result, the top panel 240 slides in the longitudinal direction of the carriage portion 200, independently of the carriage portion 200.

Figure 7A:
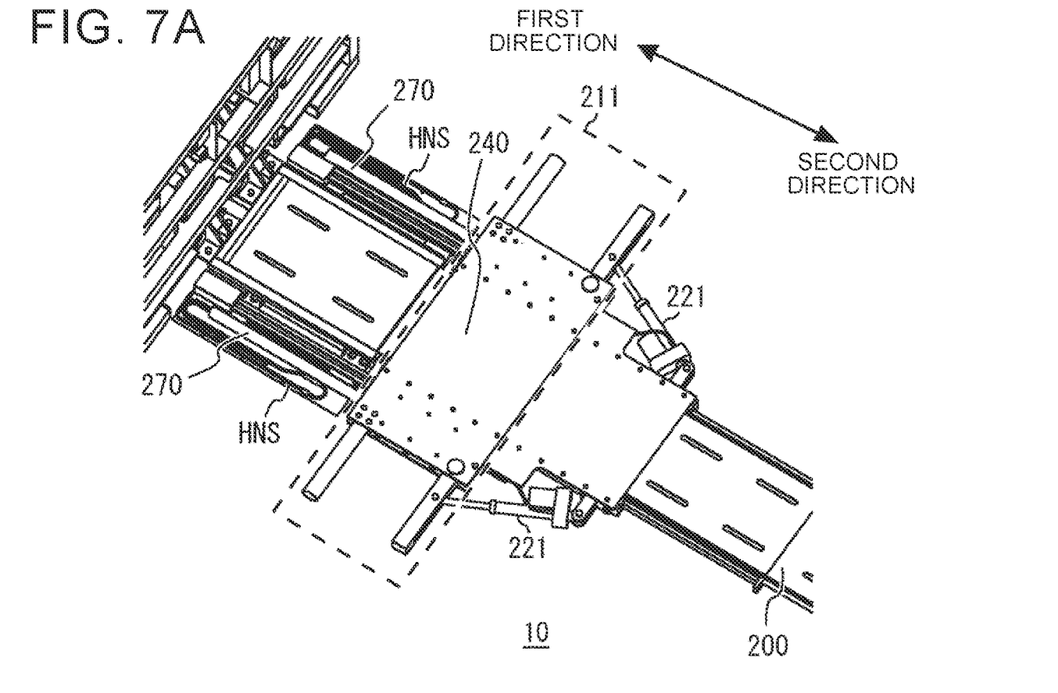
FIG. 7A is a view showing an example of sliding using the slide mechanism of the vehicle conveyor.
Figure 7B:
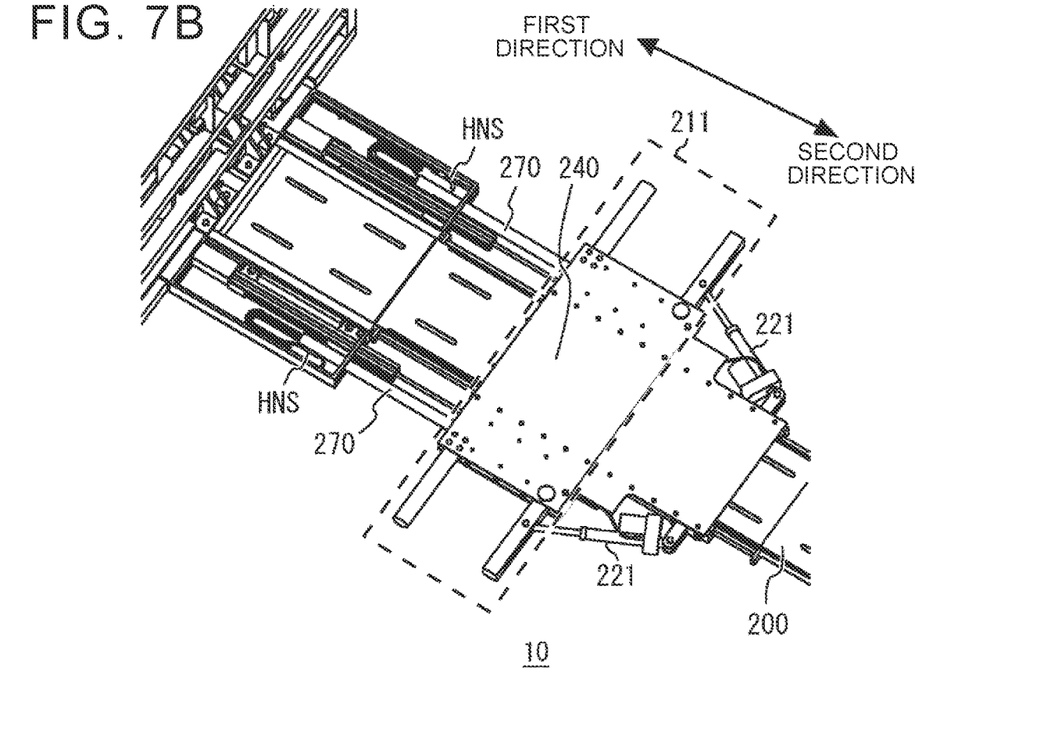
FIG. 7B is a view showing an example of sliding using the slide mechanism of the vehicle conveyor.

FIG. 7A and FIG. 7B show an example of sliding by the slide mechanism of the vehicle conveyor 10. In FIGS. 7A, 7B showing different sliding states of the slide members 250, a portion of the vehicle conveyor 10 including the first arm set 211, the first arm actuators 221, and the vicinity thereof, is illustrated. In FIG. 7B, the slide members 250 slide in the second direction, along the longitudinal direction of the carriage portion 200, as compared with those of FIG. 7A.

As shown in FIG. 7A and FIG. 7B, as the slide members 250 slide, the first arm set 211, first arm actuators 221, and top panel 240 slide along the longitudinal direction of the carriage portion 200, independently of the carriage portion 200. Similarly, as the harness protection members 270 slide, the wire harnesses HNS are prevented from being exposed.

2-2. Operation of Slide Actuator

Figure 8A:
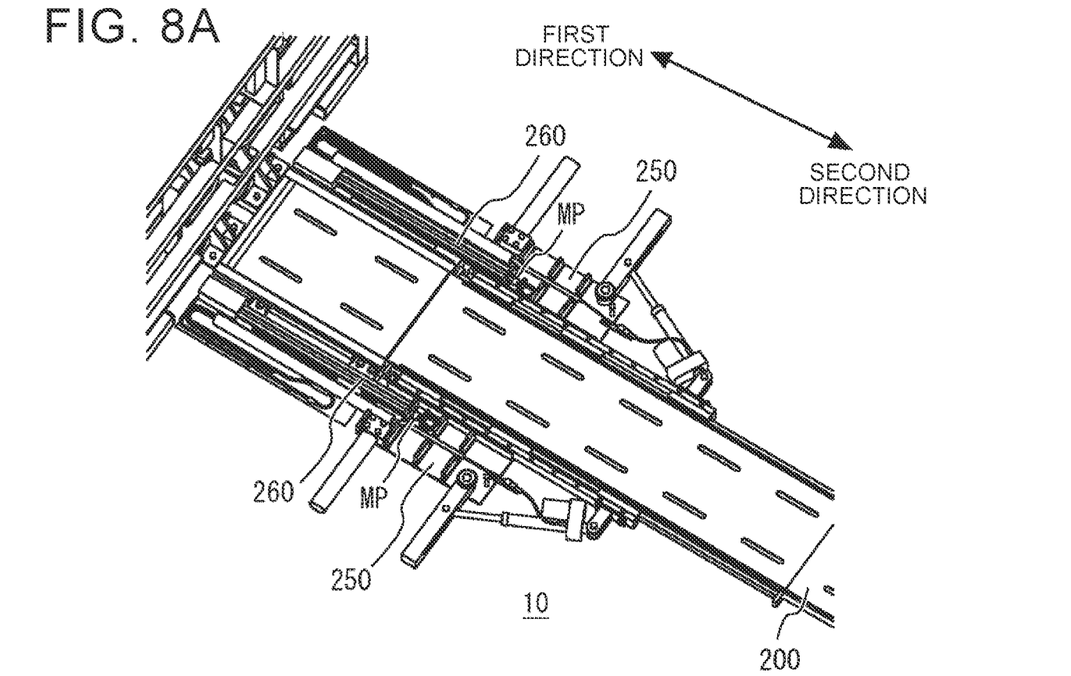
FIG. 8A is a view useful for describing operation of slide actuators.
Figure 8B:
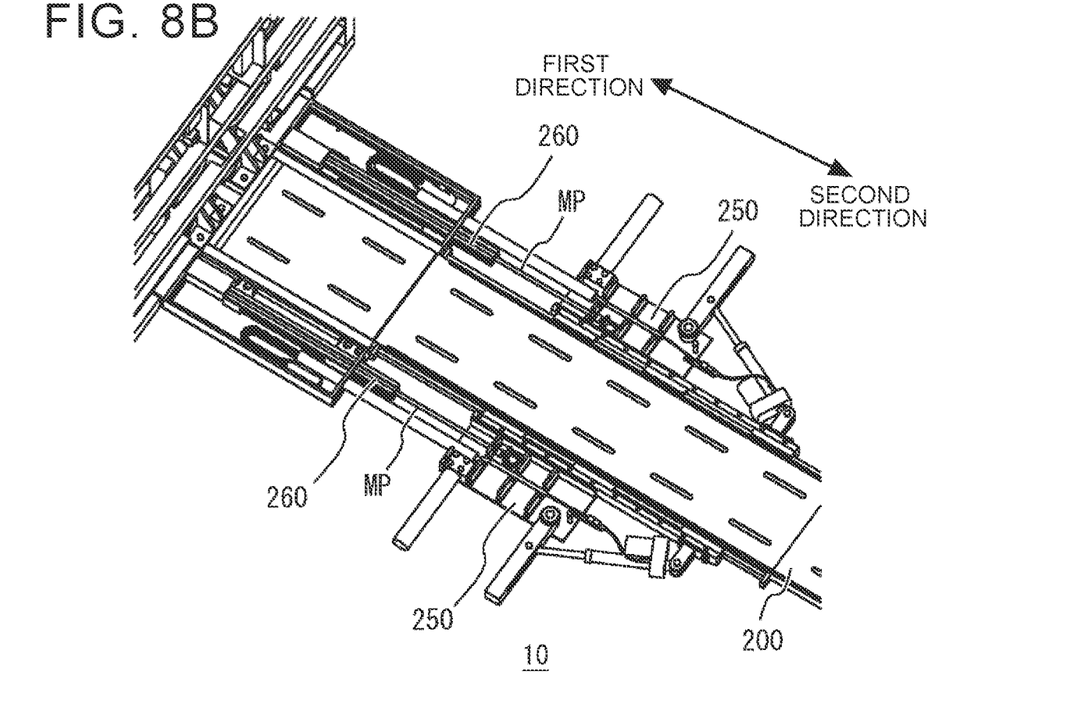
FIG. 8B is a view useful for describing operation of the slide actuators.

FIG. 8A and FIG. 8B are views useful for describing operation of the slide actuators 260. FIGS. 8A, 8B, which are equivalent to FIG. 6B, show different sliding states of the slide members 250.

Each of the slide actuators 260 includes a rod-like movable portion MP that is movable in the longitudinal direction of the carriage portion 200. The movable portion MP is joined to the corresponding slide member 250. As shown in FIG. 7A and FIG. 7B, the movable portion MP of the slide actuator 260 moves in the longitudinal direction of the carriage portion 200, so as to push or pull the corresponding slide member 250.

2-3. Configuration of Slide Member

Figure 9:
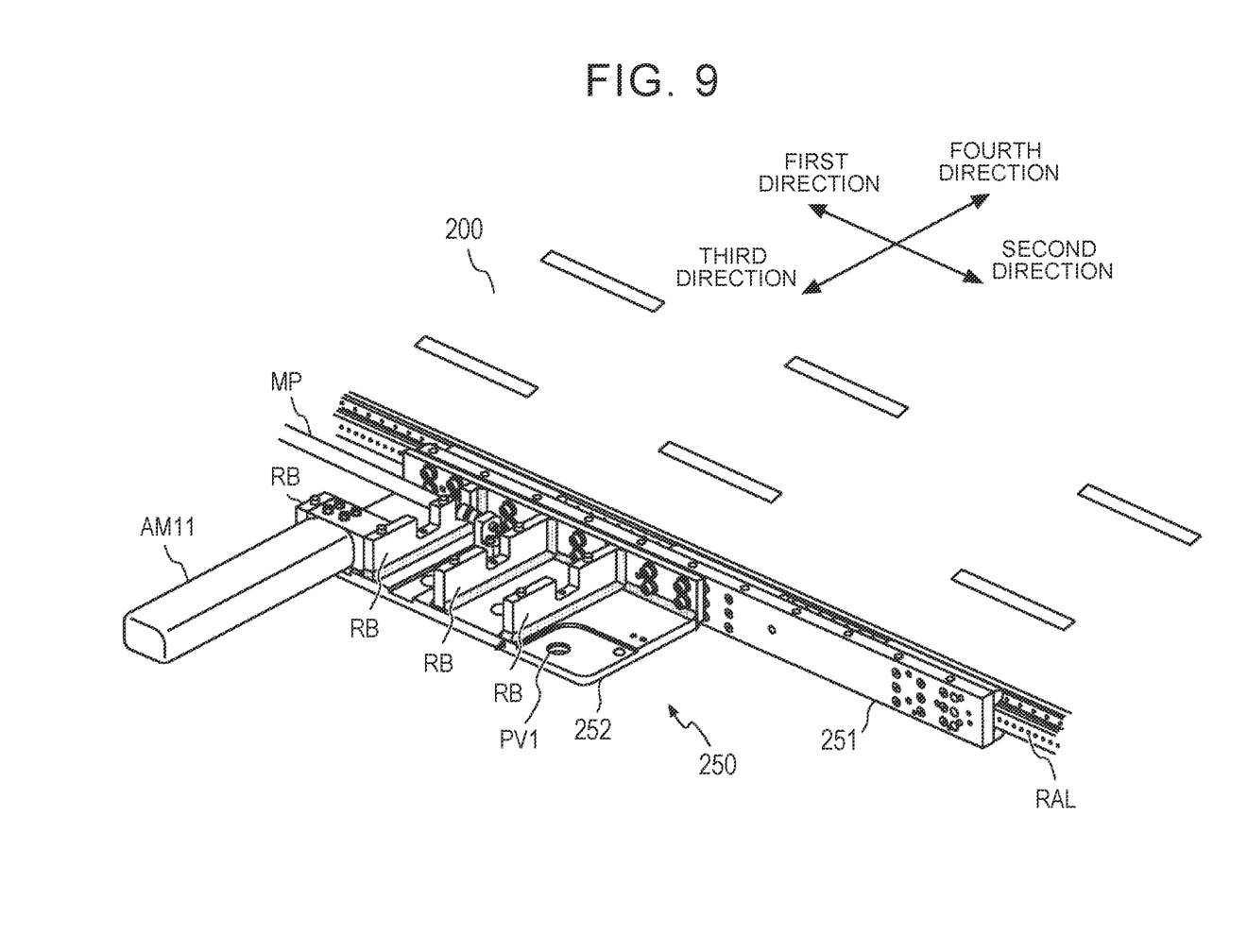
FIG. 9 is a view useful for describing the configuration of a slide member.

FIG. 9 is a view useful for describing the configuration of the slide member 250. FIG. 9 shows a portion of the vehicle conveyor 10 including the slide member 250 provided on a side face of the carriage portion 200 that faces in the third direction, and its vicinity. In FIG. 9, the slide member 250, arm AM 11, movable portion MP of the slide actuator 260, and carriage portion 200 are illustrated, and the other constituent portion of the vehicle conveyor 10 is not illustrated.

The slide member 250 consists of a slide portion 251 and a joint portion 252.

The slide portion 251 provides a sliding function of the slide member 250. As shown in FIG. 9, the slide portion 251 is engaged with a rail portion RAL provided on each of the opposite side faces of the carriage portion 200, and slides along the rail portion RAL. Typically, the slide portion 251 is engaged with the rail portion RAL via rolling elements, such as balls or cylindrical rollers, and slides as the rolling elements roll.

With the arrangement in which the slide portion 251 slides while being engaged with the rail portion RAL provided on each of the opposite side faces of the carriage portion 200, space above and below the carriage portion 200, which would be needed to provide a slide mechanism, can be reduced or eliminated. As a result, the height of the carriage portion 200 can be reduced, and the range of the vehicle height of the vehicle 1 that can be conveyed can be increased.

The first arm set 211, first arm actuators 221, etc. are joined and attached to the joint portions 252. The joint portions 252 are joined to and integrated with the slide portions 251. As shown in FIGS. 8A, 8B, the joint portion 252 has a plurality of ribs RB.

The top panel 240 is joined to the slide members 250 with the ribs RB. Thus, the load of the vehicle 1 can be evenly dispersed at the slide members 250. Also, in a condition where the arms AM that rotate to be switched between the support state and the release state are attached to the slide members 250, the load at the rotation axis (position PV1) of the arm AM can be reduced.

Each of the ribs RB has a recess through which the wire harness HNS is passed. However, the rib RB is not separated by the recess. Thus, the ribs RB, which have recesses without being separated, permit the wire harness HNS to pass therethrough, while curbing reduction of the rigidity of the joint portion 252. Also, the top panel 240 and the ribs RB are joined together at the opposite sides of the recesses of the ribs RB.

The arm AM 11 is a fixed arm, and its end portion is joined to the joint portion 252 with screws, such that the arm AM 11 extends in the third direction. Thus, the arm AM 11 is fixed in a condition where it extends in a direction perpendicular to the longitudinal direction of the carriage portion 200. As described above, the first arm actuator 221 is not connected to the arm AM 11. Also, the arm AM 11 cannot be supported by suspension, so as to secure a place for the slide actuator 260 and the harness protection member 270, while sliding integrally with the slide member 250. Therefore, the arm AM 11 may not have sufficient rigidity, against the load received from the vehicle 1, and may not be able to sufficiently reduce stress.

Thus, in the vehicle conveyor 10 according to this embodiment, as shown in FIG. 9, the joined portion of the slide member 250 and the movable portion MP of the slide actuator 260 is located on the inner side of the joint portion 252, as viewed in a direction perpendicular to the longitudinal direction of the carriage portion 200, and the joined portion of the arm AM 11 is provided on the outer side of the joint portion 252. With this arrangement, the bending moment applied to the arm AM 11 can be reduced. Further, the joined portion of the arm AM 11 is sandwiched between the ribs RB. Thus, the rigidity of the arm AM 11 can be enhanced. In this manner, the stress generated in the arm AM 11 can be sufficiently reduced.

A component that serves as a filling may be interposed between the joined portion of the arm AM 11 and the ribs RB, so that the joined portion is sandwiched between the ribs RB.

The configuration of the slide member 250 as described above with reference to FIG. 9 is common to the slide members 250 provided at the opposite side faces of the carriage portion 200. Namely, the configuration of the slide member 250 provided on one side face of the carriage portion 200 facing in the fourth direction is substantially identical with that described above referring to FIG. 9. In this case, the fixed arm joined to the joint portion 252 with screws is the arm AM 12.

Figure 10:
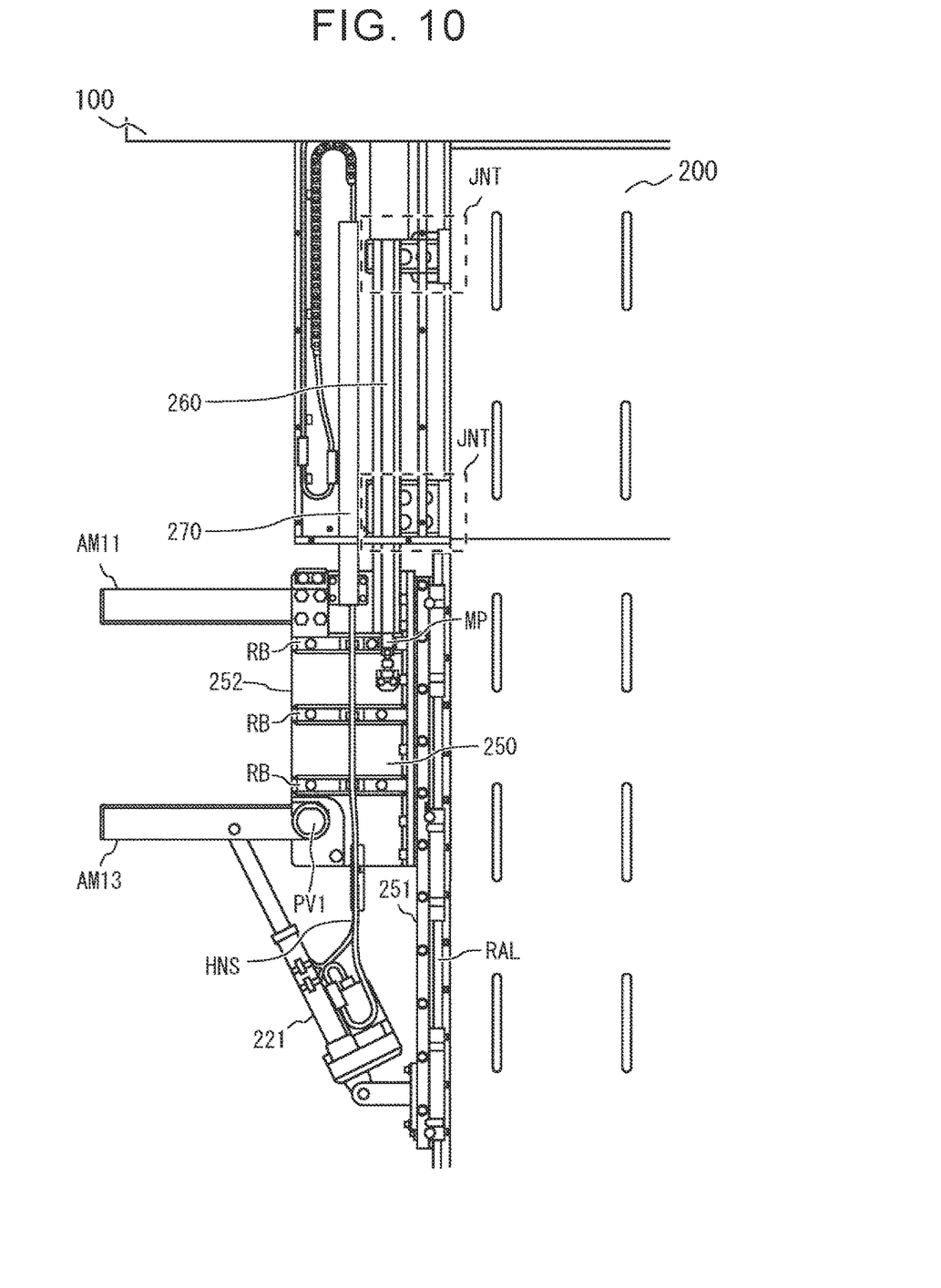
FIG. 10 is a top view of a slide mechanism portion of the vehicle conveyor.

FIG. 10 is a top view of a slide mechanism portion of the vehicle conveyor 10. FIG. 10 shows one side of the carriage portion 200 facing in the third direction. It is, however, to be noted that the other side of the carriage portion 200 facing in the fourth direction is configured similarly to and symmetrically with that shown in FIG. 10.

As describe above, the arms AM, first arm actuator 221, movable portion MP of the slide actuator 260, and harness protection member 270 are joined and attached to the joint portion 252 of the slide member 250. The wire harness HNS is configured to pass through the recesses of the ribs RB.

As shown in FIG. 10, the slide actuator 260 is connected to the carriage portion 200 via a junction member JNT. Thus, with regard to deflection due to the load of the vehicle 1, the deflection of the slide member 250 and the deflection of the slide actuator 260 as a whole can be made substantially equal. As a result, movement of the movable portion MP of the slide actuator 260 can be prevented from being impeded by deflection, and the movable portion MP can make smooth movement.

3. Effects

As described above, in the vehicle conveyor 10 according to this embodiment, the first arm set 211 and the first arm actuators 221 are configured to slide in the longitudinal direction of the carriage portion 200, independently of the carriage portion 200. Thus, it is possible to adjust the positions of the arms AM in accordance with the positions of the wheels of the vehicle 1, without partially expanding or contracting the carriage portion 200. Consequently, the vehicle conveyor 10 can employ the mechanism that is able to adjust the positions of the arms AM, without increasing its size.

Next, in the vehicle conveyor 10 according to this embodiment, the slide mechanism is configured such that the slide portion 251 of the slide member 250 slides while being engaged with the rail portion RAL provided on each of the opposite side faces of the carriage portion 200. With this arrangement, space above and below the carriage portion 200, which would be needed for providing the slide mechanism, can be reduced or eliminated. Consequently, it is possible to reduce the height of the carriage portion 200, and increase the range of the vehicle height of the vehicle 1 that can be conveyed.

Next, in the vehicle conveyor 10 according to this embodiment, the end portions of the fixed arms (the arm AM 11 and arm AM 12), which extend in the direction perpendicular to the longitudinal direction of the carriage portion 200, are joined to the slide members 250 with screws. Here, the joined portion of the slide member 250 and the movable portion MP of the slide actuator 260 is located on the inner side of the joint portion 252, as viewed in the direction perpendicular to the longitudinal direction of the carriage portion 200, and the joined portion of the slide member 250 and the fixed arm is located on the outer side of the joint portion 252. Namely, the joined portion of the slide member 250 and the movable portion MP of the slide actuator 260 is located on the inner side of the joined portion of the slide member 250 and the fixed arm, as viewed in the direction perpendicular to the longitudinal direction of the carriage portion 200. Also, the fixed arm is sandwiched between the ribs RB of the joint portion 252. With this arrangement, it is possible to enhance the rigidity of the fixed arms against the load received from the vehicle 1, and reduce stress generated in the fixed arms.

Next, the vehicle conveyor 10 according to this embodiment includes the top panel 240 joined to the first arm set 211 and the slide members 250. Here, the top panel 240 is joined to the ribs RB of the joint portions 252. With this arrangement, it is possible to enhance the rigidity of the first arm set 211 and the slide members 250 against the load received from the vehicle 1, and reduce the load on the rotation axis of the arm AM. Also, the top panel 240 can slide integrally with the slide members.

Next, the vehicle conveyor 10 according to this embodiment includes the harness protection members 270, and the harness protection members 270 are joined to the slide members 250. With this arrangement, the wire harness HNS is prevented from being exposed upon sliding of the corresponding first arm actuator 221, and the maintainability of the vehicle conveyor 10 can be improved.

What is claimed is:

1. A vehicle conveyor for conveying a vehicle with four wheels having a pair of front wheels and a pair of rear wheels, comprising:
    a carriage portion inserted under the vehicle in a longitudinal direction of the vehicle;
    an arm set coupled to the carriage portion, the arm set including a first arm set operable to support a pair of first wheels as one of the pair of front wheels and the pair of rear wheels, and a second arm set operable to support a pair of second wheels as the other of the pair of front wheels and the pair of rear wheels;
    a first arm actuator connected to the first arm set, and operable to switch the first arm set between a support state in which the first arm set is in contact with the first wheels, and a release state in which the first arm set is not in contact with the first wheels;
    a second arm actuator connected to the second arm set, and operable to switch the second arm set between a support state in which the second arm set is in contact with the second wheels, and a release state in which the second arm set is not in contact with the second wheels; and
    a slide member that is provided on each of opposite side faces of the carriage portion, and is configured to slide in a longitudinal direction of the carriage portion, independently of the carriage portion,
    wherein the first arm set and the first arm actuator are joined to the slide member, and are configured to slide in the longitudinal direction integrally with the slide member, independently of the carriage portion, and
    wherein the vehicle is conveyed when moved in a condition where the vehicle is supported with the first arm set and the second arm set in contact with the first wheels and the second wheels, respectively, and the carriage portion is raised to lift the vehicle.

2. The vehicle conveyor according to claim 1, wherein the slide member is configured to slide while being engaged with a rail portion provided on each of the opposite side faces of the carriage portion.

3. The vehicle conveyor according to claim 1, further comprising:
    a main body portion provided at one end of the carriage portion in the longitudinal direction, on one side where the first arm set is provided, the main body portion providing a traveling function of the vehicle conveyor and a function of raising and lowering the carriage portion; and
    a slide actuator provided between the main body portion and the slide member, and configured to slide the slide member,
    wherein the slide actuator includes a rod-like movable portion joined to the slide member and configured to move in the longitudinal direction to slide the slide member,
    wherein the first arm set includes a fixed arm adapted to be in contact with one of the first wheels, on one side where the main body portion is provided, the fixed arm having an end portion that is joined to the slide member with a screw, in a condition where the fixed arm extends in a direction perpendicular to the longitudinal direction, and
    wherein a joined portion of the slide member and the movable portion is located on an inner side of a joined portion of the slide member and the fixed arm, as viewed in the direction perpendicular to the longitudinal direction.

4. The vehicle conveyor according to claim 3, wherein:
    the slide member has a plurality of ribs; and
    the joined portion of the slide member and the fixed arm is sandwiched between the ribs.

5. The vehicle conveyor according to claim 1, further comprising a top panel joined to the first arm set and the slide member, the top panel being configured to slide in the longitudinal direction, integrally with the slide member, independently of the carriage portion.

6. The vehicle conveyor according to claim 5, wherein:
    the slide member has a plurality of ribs; and
    the top panel and the slide member are joined at the ribs.

7. The vehicle conveyor according to claim 1, further comprising a harness protection member configured to protect a wire harness that supplies power to each of the first arm actuator and the second arm actuator,
    wherein the harness protection member is joined to the slide member, and is configured to slide along the longitudinal direction, integrally with the slide member, independently of the carriage portion.

8. The vehicle conveyor according to claim 1, wherein the first arm set and the first arm actuator are joined to the slide member, and are configured to slide in the longitudinal direction integrally with the slide member, independently of the carriage portion without changing a position in a longitudinal direction of the carriage portion.

9. The vehicle conveyor according to claim 1, wherein a main body portion provided at one end of the carriage portion in the longitudinal direction, on one side where the first arm set is provided, the main body portion configured to permit the vehicle conveyer to travel and configured to raise and lower the carriage portion,
    wherein the first arm set and the first arm actuator are positioned closer to the main body portion that the second arm set and the second arm actuator.

* * * * *